(12) United States Patent
Belsey et al.

(10) Patent No.: US 11,748,129 B2
(45) Date of Patent: *Sep. 5, 2023

(54) SIMULATED CHANGE OF IMMUTABLE OBJECTS DURING EXECUTION RUNTIME

(71) Applicant: Morgan Stanley Services Group Inc., New York, NY (US)

(72) Inventors: James Harry Belsey, London (GB); Cuneyt Varol, New York, NY (US); Gjeta Gjyshinca, London (GB); Dmitry Zaslavsky, Edison, NJ (US); Peter Christian Boehm, London (GB); Michael James Dominic Skells, London (GB); Albert Eugene Novark, New York, NY (US)

(73) Assignee: Morgan Stanley Services Group Inc., New York, NY (US)

( * ) Notice: Subject to any disclaimer, the term of this patent is extended or adjusted under 35 U.S.C. 154(b) by 295 days.

This patent is subject to a terminal disclaimer.

(21) Appl. No.: 17/071,498

(22) Filed: Oct. 15, 2020

(65) Prior Publication Data
US 2022/0121462 A1    Apr. 21, 2022

(51) Int. Cl.
*G06F 9/455*    (2018.01)
*G06F 8/41*    (2018.01)
*G06F 9/448*    (2018.01)

(52) U.S. Cl.
CPC ............ *G06F 9/45516* (2013.01); *G06F 8/41* (2013.01); *G06F 9/4493* (2018.02); *G06F 2212/60* (2013.01)

(58) Field of Classification Search
CPC .......... G06F 8/41; G06F 8/443; G06F 9/4493; G06F 9/455; G06F 9/45508;
(Continued)

(56) References Cited

U.S. PATENT DOCUMENTS 5,784,552 A * 7/1998 Bishop ............... G06F 11/3636
714/E11.21
5,812,828 A * 9/1998 Kaufer ............... G06F 9/45504
703/22

(Continued)

OTHER PUBLICATIONS

Balakrishnan, Darshana, et al., Fluid Data Structures, DBPL 2019: Proceedings of the 17th ACM SIGPLAN International Symposium on Database Programming Languages, Jun. 2019, 15 pages, [retrieved on Oct. 25, 2022], Retrieved from the Internet: <URL:http://dl.acm.org/>.*

(Continued)

*Primary Examiner* — Geoffrey R St Leger
(74) *Attorney, Agent, or Firm* — WEITZMAN LAW OFFICES, LLC

(57) ABSTRACT

A system for executing software, wherein a computing device stores first software instructions for a code execution module such that, when the first software instructions are executed, the computing device will: receive, for execution by the code execution module, second software instructions; create one or more immutable software nodes described in the second software instructions; determine that the second software instructions comprise an instruction to begin a simulated change at runtime of the one or more immutable software nodes; store the simulated change in a simulated change apparatus; using the simulated change apparatus, perform one or more operations of the second software instructions as if the one or more immutable software nodes had been changed in memory, during a period of time where each of the one or more immutable software nodes is guaranteed to retain logical immutability; and output results of the one or more operations.

25 Claims, 7 Drawing Sheets

(58) Field of Classification Search
CPC ............. G06F 9/45516; G06F 2212/45; G06F 2212/452; G06F 2212/60; G06F 12/0802
USPC ................. 717/116, 135, 139, 140, 148, 151
See application file for complete search history.

(56) References Cited

U.S. PATENT DOCUMENTS

| | | |
|---|---|---|
| 7,861,217 B2 | 12/2010 | Ciolfi |
| 8,423,975 B1 | 4/2013 | Scallon |
| 9,098,269 B2 | 8/2015 | Duffy |
| 2006/0036426 A1 | 2/2006 | Barr |
| 2009/0307528 A1* | 12/2009 | Byers .................... G06F 11/366 |
| | | 714/E11.178 |
| 2010/0198799 A1 | 8/2010 | Krishnan |
| 2015/0309772 A1 | 10/2015 | Duggal |
| 2019/0213101 A1* | 7/2019 | Raviv ................... H04L 51/046 |

OTHER PUBLICATIONS

Coblenz, Michael, et al., Exploring Language Support for Immutability, 2016 IEEE/ACM 38th International Conference on Software Engineering (ICSE), May 2016, 12 pages, [retrieved on May 17, 2023], Retrieved from the Internet: <URL:http://ieeexplore.ieee.org/>.*

* cited by examiner

SIMULATED CHANGE OF IMMUTABLE OBJECTS DURING EXECUTION RUNTIME

FIELD OF INVENTION

This application relates to software for executing code on a computing device, and more specifically, an environment that enables efficiently managing data structures while considering program states that do not change underlying stored immutable objects.

BACKGROUND

When a computer programmer writes source code in a high-level programming language, the code must, either before or during execution, be transformed from an almost-English set of instructions into a form that is intelligible to a computer processor as a series of discrete instructions at the machine level. For some languages, usually termed "interpreted languages" or "scripting languages," the source code is loaded directly into a computer program called an interpreter that generates the machine instructions at runtime, which can result in much slower execution as the processor waits for commands from the interpreter. For other languages, usually termed "compiled languages," a computer program called a compiler generates the machine language that will be needed for a particular processor type and possibly operating system (OS), allowing for faster execution but generating a compiled program that may not be compatible with other processor types or OSs.

A few programming languages such as Java have been designed with a hybrid approach in mind. High-level source code is compiled into an intermediate "bytecode" that is optimized for speed and efficiency in comparison to the source code, and is the same for all processor and operating system types, but is not intended to be directly intelligible by any processor. Then, an interpreter (for example, the Java Virtual Machine) that is configured for a particular processor and OS receives bytecode and generates the proper machine instructions for the processor with less overhead processing than a scripting interpreter. As a result, speed of execution is balanced with cross-platform compatibility of a single distributable compiled version of bytecode.

One feature of many programming languages is that variables which are not "primitives" (for example, an integer or a boolean value) and instead are more complicated Objects, such as a String or HashTable, are not directly changed in memory when a program instruction attempts to change the object reference. Instead, the reference to the Object is redirected to a newly created Object, and the older Object remains in memory, or may be subsequently removed by an automated "garbage collector" or a manual command to free a region of memory for later use. Thus, for example, code reading "String s="hello"; s="goodbye"; s="hello again"" would actually create at least three new Objects in memory, despite the variable s only pointing to the memory address storing the last of the three. This problem is further compounded when Objects contain references to other Objects, so that a change in one reference causes a cascading chain of newly created Objects, or in multi-threaded applications, where changes in Objects may need to be propagated into other concurrently-executed processes than the process originally making the change to one or more objects. As a result, software often either needs to be written with extra care or complexity to minimize the numbers of newly created objects at runtime, or else suffer unnecessarily decreased performance during runtime.

SUMMARY OF THE INVENTION

A system for executing software is disclosed, comprising a computing device comprising at least one processor and non-transitory memory storing first software instructions for a code execution module. When the first software instructions are executed by the at least one processor, the at least one processor will: receive, for execution by the code execution module, second software instructions; create one or more immutable software nodes described in the second software instructions; determine that the second software instructions comprise an instruction to begin a simulated change at runtime of the one or more immutable software nodes; store the simulated change in a simulated change apparatus; using the simulated change apparatus, perform one or more operations of the second software instructions as if the one or more immutable software nodes had been changed in memory, during a period of time where each of the one or more immutable software nodes is guaranteed to retain logical immutability; and output results of the one or more operations.

A method of simulating change of immutable elements during runtime of a software executable is also disclosed, comprising: receiving, for execution by a code execution module, second software instructions; creating one or more immutable software nodes described in the second software instructions; automatically determining that the second software instructions comprise an instruction to begin a simulated change at runtime of the one or more immutable software nodes; storing the simulated change in a simulated change apparatus; using the simulated change apparatus, performing one or more operations of the second software instructions as if the one or more immutable software nodes had been changed in a non-transitory memory, during a period of time where each of the one or more immutable software nodes is guaranteed to retain logical immutability; and outputting results of the one or more operations.

DETAILED DESCRIPTION

In response to the difficulties of managing desired changes to software objects at runtime, an infrastructure may be created to manage a number of developer-defined "tweaks," or changes to "nodes," (which may include objects, variables/data fields, and functions) that do not disturb or recreate existing underlying objects on the heap used by a virtual machine.

The infrastructure can be adapted to use in any development language or platform through the use of a modified source code editor, code compiler, executing virtual machine, executing interpreter, or other entity of the software development and execution pipeline, specialized to operate with/within the given language or platform. The infrastructure allows operations to be performed with the "tweaked" nodes either by encapsulating calls referring to tweaked nodes pre-execution or by intercepting function calls referring to the tweaked nodes at runtime, allowing useful output to be generated at runtime without actually creating new objects or modifying existing objects in memory.

Figure 1:
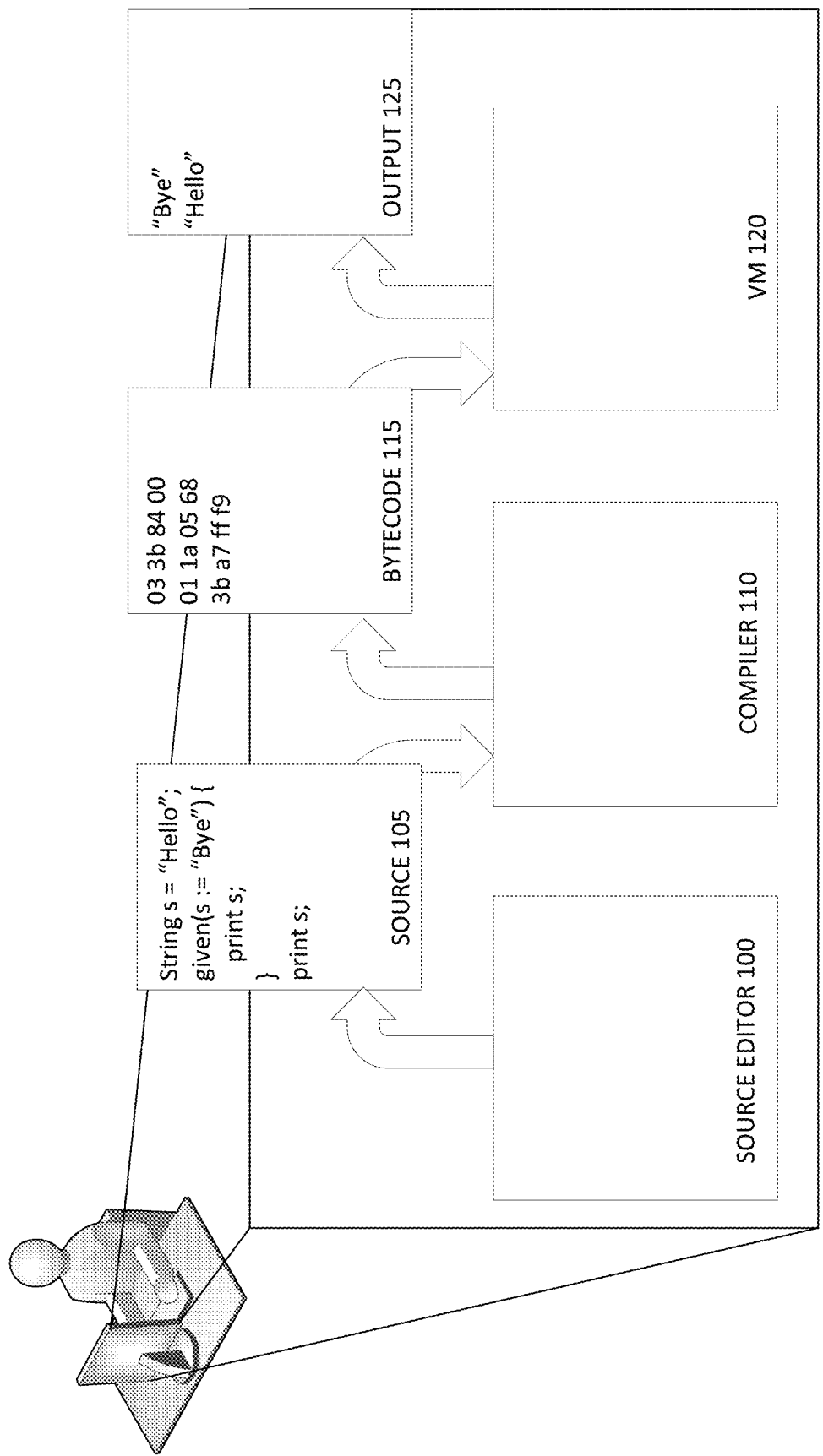
FIG. 1 depicts a code development and execution system according to methods disclosed herein.

FIG. 1 depicts an example code development and execution system according to methods disclosed herein.

A source code editor 100 or other graphical user interface for text entry may be used by a software developer to enter a source code file 105 into memory, comprising at least one simulated change to a software node (shown here as a "given" code block affecting the String s). The source code file 105 may then be input into a compiler 110, generating a bytecode file 115. Finally, the bytecode file 115 may be distributed to any number of interpreters/virtual machines (VMs) 120, on the same machine or different machines, remote or local, which execute the bytecode file 115 and generate possible output 125.

In some embodiments, each of the source code editor 100, compiler 110 and VM 120 may all reside on a single computer under the control of the developer, or even all be managed by a single application, known as an integrated development environment (IDE). In other embodiments, the components may be divided between multiple computers; for example, a developer could write code in source code editor 100, upload the code to an online repository, where a scheduled process or script may cause a compiler 110 to compile the code into a daily build, and the daily build may be downloaded onto a third computer for execution by a VM on a computer operated by a software quality assurance tester or end user.

Different VMs 120 may exist for a variety of chip architectures or other operating environments, as described previously, while the output bytecode file 115 may be the same in each instance, relying on the VM 120 to accurately transform the commands of the bytecode file into the proper commands to set data values in the memory of the computing device executing the VM 120. In other embodiments, the use of a VM may be eschewed entirely and the compiler 110 always used to generate instructions to be directly performed by a computing device's processor without an interpretation level.

In various embodiments, one or more of the source code editor 100, compiler 110, or VM 120 may be modified from a standard behavior to enable methods described herein, either through custom-coding the functionality as a completely new version of one of the above products, or by having an architecture that allows for installation of plugins or other end user modifications, so that functionality can be easily added to one or more of these three pieces of software by a software developer or end user who wishes to take advantage of it.

Although the below example describes development and execution according to a traditional compiled language, aspects of alternative embodiments could be equally well implemented in a dynamic or scripted programming language lacking a compiler entirely, either by modifying the instructions at the time of writing to allow a simulated change, modifying the instructions in a post-writing, pre-execution processing, or by modifying the software executing the instructions to be cognizant of the presence of possible simulated changes in the instructions.

Figure 2A:
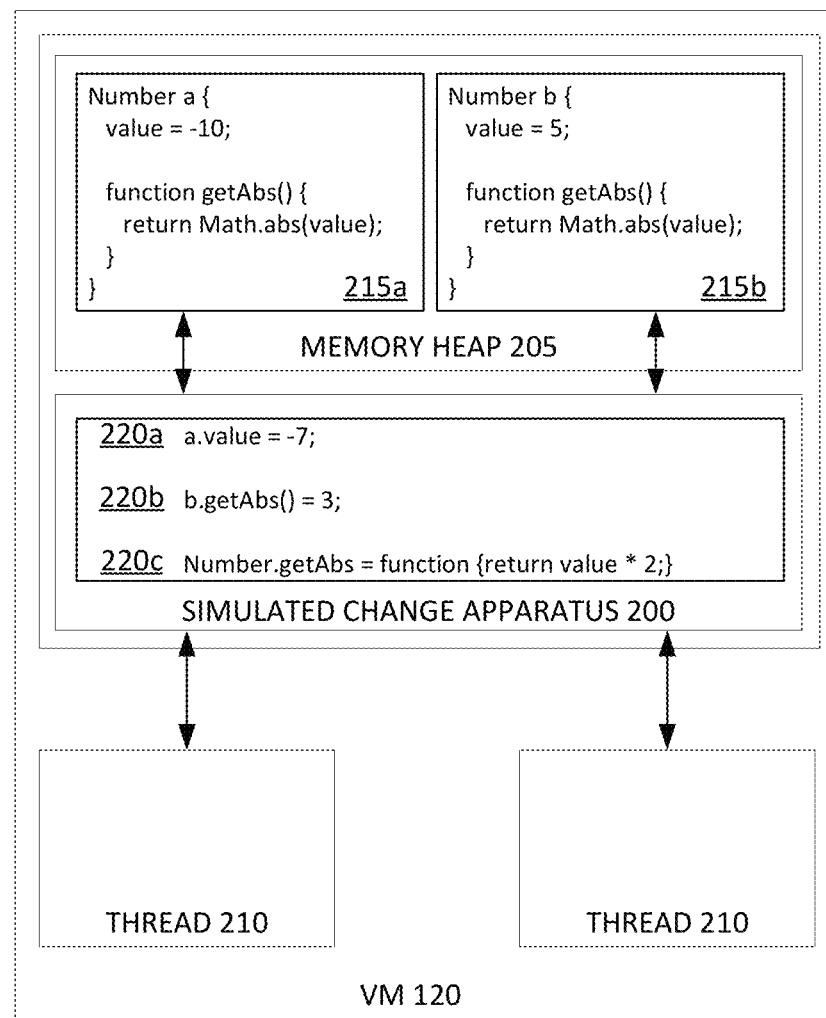
FIG. 2A depicts data structures suitable for use in executing code according to methods disclosed herein.

FIG. 2A depicts interactions between data structures suitable for use in executing code according to methods disclosed herein.

During execution of code in the VM 120, a simulated change apparatus 200 is created to store a number of simulated changes or tweaks 220a-n that may be in effect at a given moment. A remainder of the memory heap 205 (or other memory, such as memory on disk or remotely accessed via a network/cloud architecture) is used to store actual objects or variables 215a-n, instantiated by executing code, which are guaranteed to be logically immutable (i.e., once a node is created, or the outcome of a function called, it can be guaranteed that subsequent references to the node or calls of the function will always return the same value). In some embodiments, logical immutability will be guaranteed by also maintaining physical immutability, that the values stored in memory have not been changed, because the simulated change apparatus 200 has intercepted and prevented completion of any attempt to change the immutable nodes. In other embodiments, the simulated change apparatus 200 may itself change one or more nodes (for example, for performance advantage reasons, when an actual change to a node would cause creation of fewer new objects or fewer function calls than a simulated change would create within the simulated change apparatus 200), and the simulated change apparatus 200 may maintain logical immutability by intercepting references or function calls and responding to them as if the logically immutable node had not changed, even though the node has been physically changed in memory.

The VM 120 generates one or more threads 210, each of which may be operated independently and asynchronously by processors of the computing device executing the VM 120, and each of which may access the simulated change apparatus 200 and the heap 205.

However, the threads 210 may be conditionally prevented from directly accessing heap 205 through enforcement via the simulated change apparatus 200, via the VM 120 itself redirecting references, or via other changes in the code being executed such that a reference to a variable, object, or other node 215 having its address in heap 205 is instead directed to an address in the simulated change apparatus 200 that represents the tweaked version 220 of the node.

Thus, for example, as depicted in FIG. 1, a first String s may be instantiated on the heap 205 with the value "Hello", while a second String s is instantiated in the simulated change apparatus 200 with the value "Goodbye". When a thread 210 attempts to execute a line printing Strings, instead of being permitted to directly access the construct representing the true String s in memory, the thread instead is permitted to retrieve the tweaked variable s from simulated change apparatus 200 and operate upon it.

In another example, as depicted in FIG. 2, a developer might create a simple object type to store a number, and to return the absolute value of that number when requested. If the developer creates a first Number a, with value −10, and a second Number b, with value 5, the Number objects are stored normally (215a and 215b respectively).

The developer might then create a number of simulated changes. In a first simulated change 220a, she might explicitly set the value of a to −7 instead of −10. In the second simulated change 220*b*, she might declare that the output of b's getAbs function is 3. Finally, in a third simulated change 220*c*, she might declare that the Number class representation in the code itself has redefined the getAbs function to instead double the value. These changes are stored in the simulated change apparatus 200.

As a result, when the threads 210 attempt to perform calculations on objects 215*a* and 215*b*, the simulated change apparatus 200 will short-circuit attempts to access data directly.

If a thread attempts, after only simulated change 220*a*, to print out a's value, it will be permitted only to see the value stored by change 220*a*, and print out −7 instead of −10. If the thread attempts to print out a.getAbs( ), it will be permitted to access the unchanged function that requires the use of a's value, but then it will still be forced to use the modified value stored in change 220*a*, so that positive 7 is printed out instead of positive 10.

If a thread attempts, after only simulated change 220*b*, to print out b.getAbs( ), it will be permitted only to see the value stored by change 220*b*, and print out 3, notwithstanding the existence of the function and the stored value. In some embodiments, if it attempts to print out b's value, it may print out 5, as there is no simulated change that formally defines a change to b's value, only to behavior of the getAbs function. In other embodiments, as described further below, a developer may be able to specify a method for back-propagating a first simulated change into a second simulated change to maintain logical consistency—in this case, setting b's value to either 3 or −3.

If a thread attempts, after only simulated change 220*c*, to print out a.getAbs( ) or b.getAbs( ), it would be permitted to see the redefinition of the function in simulated change 220*c*, and thereafter to directly or indirectly access the values of objects 215*a* and 215*b* to print out −20 and 10 respectively. If simulated change 220*c* were in effect at a same time as either simulated change 220*a* or 220*b*, rules of precedence or other configuration may be established to determine whether a.getAbs( ) should return a doubling of the simulated value −7 or the true value −10, and whether b.getAbs( ) should return a doubling of the value 5, or the explicitly cached value of 3 that is independent from the functional definition.

Figure 2B:
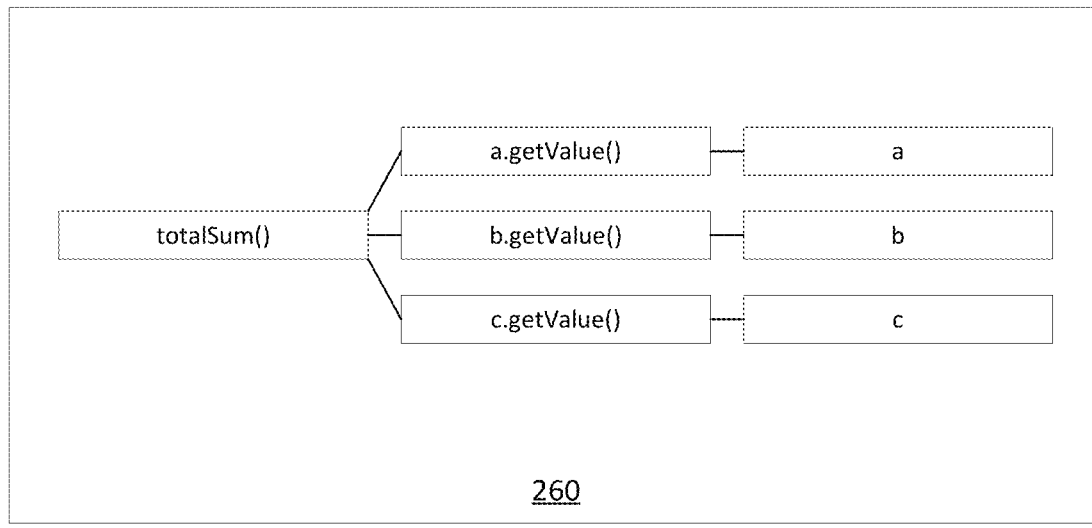
FIG. 2B depicts alternative data structures for storing and/or propagating simulated change throughout a distributed system.

FIG. 2B depicts alternative data structures for storing and/or propagating simulated change throughout a distributed system.

In some embodiments, as with simulated changes 220*a-c* from FIG. 2A, each simulated change may be stored as a completely independent "memo" of a change to a particular node, so that a simulated change apparatus 200 need only have the equivalent of a data structure 250 with two columns: nodes 250*a* and cached values 250*b* of those nodes.

In other embodiments, a data structure 255 may store simulated changes of values 255*b* to nodes 250*a* in conjunction with various dependencies 255*c* of each of those nodes. For example, if a function totalSum( ) were defined to call getValue( ) on a set of three objects and add those values together, a series of entries would record that totalSum depends on each of the get Values, which in turn each depend on the object nodes. In some embodiments, a single table (or other data structure for a set of dependencies) might be stored in data structure 255, as depicted in FIG. 2B. In other embodiments, two tables might be used, so that one table stores relationships with the indexed key of the dependency being the parent node, while the other table's indexed key is the child node, allowing for query efficiency in traversing dependency chains in either direction. In yet other embodiments, a standard Map<T>, List<T>, or other default data structure may be used to provide the functionality of data structure 255.

In some embodiments, the data structure 255 could enable quickly propagating a simulated change in an independent node forward through all its logical dependencies in a currently-running system and maintain logical consistency even in cached values. Tracking objects may be created to "listen" for a tweaked variable and notify all variables that depend on that tweaked variable, indicating that a recalculation of a value may be necessary.

For example, if the object a were to undergo a simulated change to have a value of 11, the data structure could be searched and the simulated change apparatus 200 could automatically determine that the cached value of a.getValue( ) needs to similarly have a simulated change, and iteratively, that totalSum( ) needs a simulated change to return 31 instead of 30.

In other embodiments, simulated changes may be propagated in the other direction, such that a simulated change in a dependent node triggers a search by the simulated change apparatus 200 for code that defines how a simulated change in the dependent node should trigger a simulated change, if any, in nodes from which it depends. For example, in a possible software development situation described further below, a duration property of a Meeting object in a calendar application may normally be dependent on a start time property and an end time property, and equivalent to the difference between the two times. However, code may specify how to handle an attempt to override the duration property, and changing the start time or end time appropriately to maintain coherence of the data fields.

Change propagation in either direction may be configured to be automatic, or alternatively, to flag a cached value as possibly outdated, but not to actually reset or recalculate the cached value unless referenced, possibly leading to a performance improvement by avoiding calculations.

In some embodiments, data structure 255 could be conceptually visualized as (or used to generate, within a graphical user interface during code analysis or debugging) an equivalent dependency tree 260 that demonstrates the logical connections between nodes that are currently undergoing or may at another point during runtime undergo a simulated change, and show an observer how a change to one node will affect other nodes within a system, allowing a developer or other observer to examine any assumptions she may have about the interdependency of nodes or the computational cost of simulating change on a particular node.

However, in a preferred embodiment, data structure 255 could be conceptually visualized as a list of lists: for each variable, storing a list of all variables whose values can influence the value of that variable, without the hierarchical relationship among those variables mattering. Thus, even if totalSum( ) depends on a, b, and c only via intermediate calculations rather than immediately using them, they are all in the single list rather than each at the terminus of a different tree branch. A change in one variable can then be propagated by notifying every variable in the list of lists that has that dependency, rather than recursively passing through a tree structure.

In some embodiments, simulated changes may be shared between applications, virtual machines, or physical devices. For example, multiple computing devices could be used to simultaneously execute code undergoing simulated change. Data structures 250 or 255 may be maintained on each of the computing devices and may be shared between them to ensure that the same simulated changes are in effect on each device. If sharing of data structures occurs, the synchronization might occur at a specified interval (such as once per second) or be triggered by an event, such that the act of adding a new simulated change to one data structure triggers a push notification to other distributed data structures about the existence of the new simulated change.

Implementation of Concepts Described Above

Figure 3:
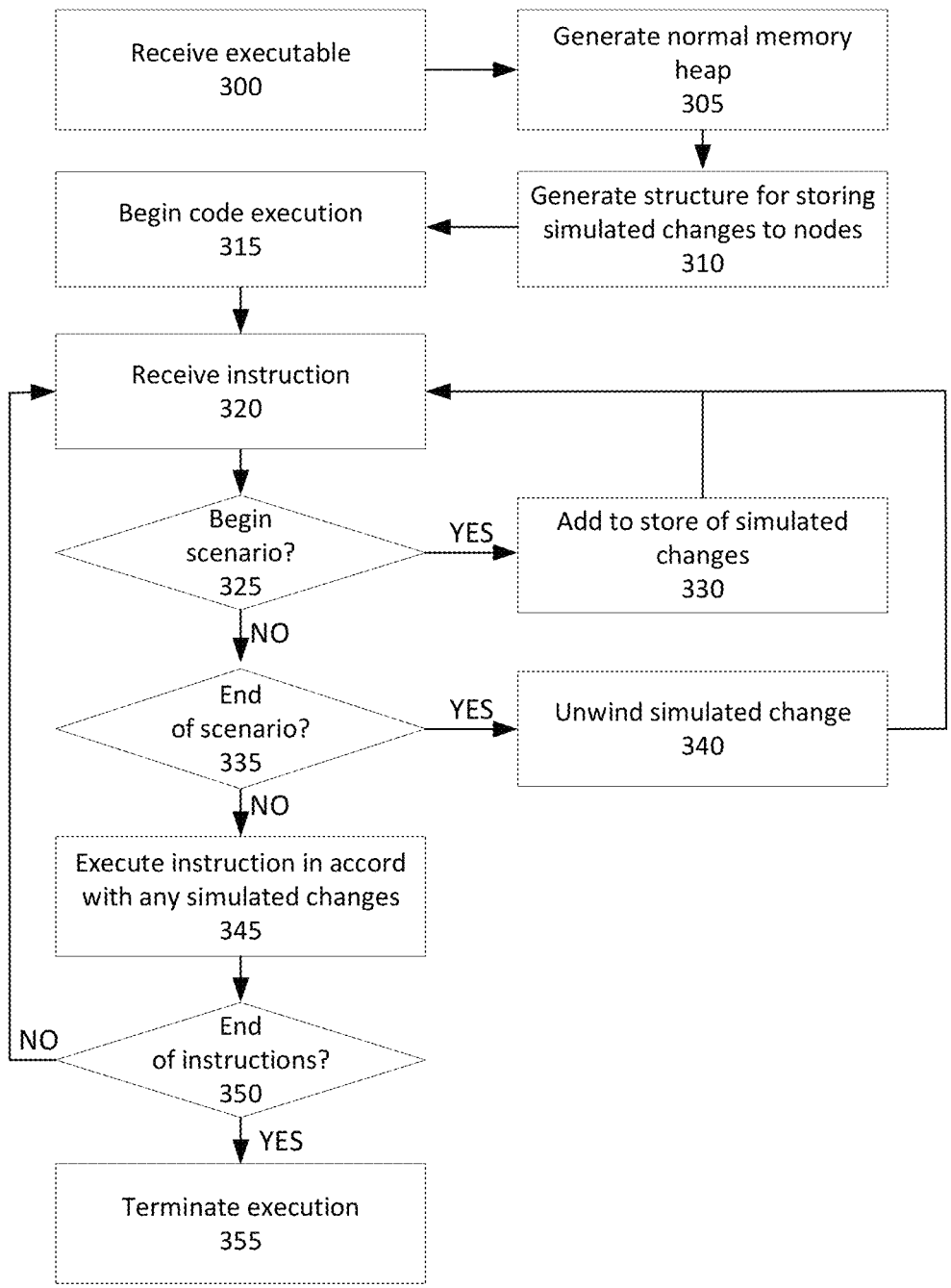
FIG. 3 depicts a method of simulating change in one or more immutable nodes during runtime execution.

FIG. 3 depicts a logical method of simulating change in one or more immutable nodes during runtime execution.

Initially, when called by the operating system, terminal, etc., a VM 120 or other software for executing code receives or retrieves a series of instructions (Step 300) to begin execution, instruction by instruction or line-by-line as appropriate for the language in which the code is written or compiled. The source of the instructions may be a file on disk, received as a network stream, input by a user in an interactive terminal, stored in short-term memory as a dynamic linked library, or from any other repository in which instructions may be entered and/or stored.

As part of normal initialization, memory may be set aside on the heap to store the various immutable objects that may be generated during runtime (Step 305). The use of short-term memory to store runtime objects is the most common embodiment, but alternatively the objects may be serialized and stored on a hard disk, on a remote networked device, or in any other logical or physical location.

Next, the simulated change apparatus is generated for storing tweaked variables, objects, and functions (Step 310).

After initialization, execution of code begins (Step 315), including reading in a first instruction from the stream of instructions (Step 320).

The executing VM or other apparatus determines whether the instruction represents a simulated change request or other command to begin operating under a scenario simulating change (Step 325). If a particular line or instruction is, the executing apparatus will store the new simulated change in the simulated change apparatus 200 (Step 330). In some embodiments, the executing apparatus will also ensure that the simulated change is propagated to any other remote executing apparatuses that may be acting in concert with this executing apparatus. In some embodiments, the executing apparatus will pre-emptively propagate any simulated changes upstream or downstream through a tree of dependencies to maintain logical consistency among all nodes and cached values.

However, in others, the change will be stored in only a single location, and when a future calculation is made, it will not rely on any cached value because the cached values will be associated with a set of one or more tweaks that are different from the set of tweaks that exist in the present scenario. Re-calculation will be performed, consulting cached values only if the set of tweaks match or the tweaks are fully independent of the present scenario, and otherwise calculating values from scratch. In this embodiment, cache coherency is not a concern, because reuse from cache can only happen when the tweaks in the present scenario exactly match those associated with the cached value.

After storing—and if necessary, propagating to other nodes the effects of—any simulated changes, the executing apparatus continues to read in additional instructions (back to Step 320).

If a given instruction is not a command to begin a scenario, the executing apparatus also determines whether it is a command to end a scenario (Step 335). If so, stored simulated changes associated with the ended scenario may be unwound (Step 340), by deletion from the simulated change apparatus 200, denoting the simulated changes as inactive or dormant without deleting them, or otherwise stopping them from being considered during future instruction execution unless explicitly re-created or re-enabled.

If a given line or instruction is neither a command to begin nor end a scenario, it is performed under the normal rules of the execution for the language/system (Step 345) with the exception that the simulated change apparatus is used to execute code as if any simulated changes in effect are currently affecting the value of immutable nodes. Whenever an instruction refers to a value, object, or other node that was tweaked, the cached value is retrieved from the simulated change apparatus 200 instead of from the originally stored, immutable node.

If the end of the stream or instructions (or file to be executed, etc.) has been reached (Step 350), the executing system will terminate execution (Step 355) and end the entire method; otherwise, the executing system will read in another line or instruction and begin the execution loop again (back to Step 320).

Methods of Modifying Code or Executables to Accomplish the Described Method

The functionality described above for causing simulated changes to be stored (in whatever format) in the simulated change apparatus 200 during execution of code can be accomplished via one or more of several methods of modified behavior at runtime or pre-processing before runtime:

First, compiler 110 may be modified to recognize code for a "given" statement (variously called throughout this disclosure a simulated change, a tweak, or a scenario) and generate bytecode that delineates the existence of the given statement. Then, VM 120 may be modified itself to recognize these additional bytecode instructions and, during the duration of a simulated change, execute the bytecode injected or rewritten by the compiler to cause simulated change to occur. For example, the end result may be that a command to change a node is treated as a command to create a new node in the simulated change apparatus 200, or by replacing one accessed memory address with another at runtime according to a lookup table or other data structure. The VM 120 tracks that a given variable reference may refer to both an immutable node and a simulated changed node, and decides, based on whether the simulated change has ended, the location from which to retrieve a referenced value or other node.

Second, compiler 110 may be modified without any corresponding modifications of the VM 120. In this embodiment, compiler 110 may analyze the source code to determine the existence of a node that is being affected by a simulated change in a given statement, and then add additional instructions to generate the simulated change apparatus 200 and store the change to the node in the structure, rather than compiling to create code that actually changes the tweaked object. References to tweaked nodes may thus be encapsulated and redirected in the resulting code, so that the compiled code does not actually contain an instruction to change an existing assigned value in memory, and instead contains an instruction to assign to a second location in memory and retrieve therefrom.

Third, a source code editor 100 (or other graphical user interface, such as a terminal window, text editor, text field of a website, etc.) may be modified without any modifications of the compiler 110 or VM 120. In this embodiment, text pattern matching and replacement may be performed as code is written or when it is saved to disk, pre-compilation, noting where a simulated change occurs and modifying the source code of the simulated change itself. For example, the source code shown in FIG. 1—String s="Hello"; (Given s="Bye")

{print s;} print s;—may be replaced in the source code text itself as—String s="Hello"; String t="Bye"; print t: print s—and thereby ensure that the reference s is not changed at runtime, even by a compiler or VM that was unaware of the simulated change intended by the programmer. While this textual example is quite simple, complex regular expressions could be used to recognize patterns in very complex code and rewrite to preserve immutability while still producing an output the developer would expect from reviewing the source code in a pre-processed state.

Fourth, in conjunction with or independent of any of the tools used above, functional features or "hooks" of various programming languages may be used to accomplish simulated change functionality without modifying executable code or an executing apparatus directly. For example, a language may allow a developer to write code that will cause certain function calls to be intercepted or modified before execution, allowing caching of a node or function output and redirection of a reference or function call to the cache.

As mentioned above, any of these modified software development or execution tools described above may be created through custom programming of the necessary modifications, or may be able to use a plugin architecture to install a plugin that modifies existing behavior to accomplish the changes described. Further, if two or even three of the tools are grouped into a single integrated development environment, the software developer may be able to select among multiple options in the IDE's interface for ensuring that simulated change occurs at runtime—for example, accomplishing it via the VM during a testing phase, but then, when software is ready for final distribution, accomplishing it via a changed compiling process so that it will work regardless of whether the VM operated on an end user's computer has been modified to allow the simulated change.

Declaring Tweakable and Non-Tweakable Nodes

In general, a system implemented according to the above methods can be used to allow a software developer to create variables, functions, objects, or other nodes that are absolutely immutable with respect to their initial state and with respect to a set of any simulated changes. This constraint is honored by the code execution system and reduces necessary assumptions and complexity by having referentially transparent nodes-nodes whose value or outcome is the same regardless of order of execution or program state, and which can thus be cached at any time for efficiency purposes and the cache trusted not to expire due to later mutation during runtime.

For example, a developer might create an object for storing a sale of an asset as follows:
@stored @entity Sale(
@node(tweak=true) val qty: Int,
@node(tweak=true) val price: Int) {
@node(tweak=false) def value=qty*price}

In this example, qty and price are each set to be tweakable, so the simulated change apparatus may be prepared to recognize and cache a simulated change to either value. value is set to be non-tweakable, as value is completely dependent on the quantity and price, and so tweaking either quantity or price and the value independently would lead to a logical inconsistency. In examples described further below, methods may be used to define behavior to ensure logical consistency even when tweaking one node that is only dependent on other nodes. Further, compilers or executing apparatuses of code may be able to make additional optimizations if they are permitted to make the (correct) assumption that a particular node will not change, and to rely on that assumption in transforming source code to machine instructions or performing additional caching to prevent unnecessary code execution.

UI Signals

Even independent of simulated changes, there is value in the above logical structure, which allows one node to be perpetually defined in relationship to one or more other nodes, no matter how those nodes may change. For example, in a user interface (UI), a user's interaction with one element (moving a slider, entering a number into a text box, or toggling a checkbox or radio button) may change one value in memory and thereby cause a cascade of changes in other values in memory that depend in whole or in part on that value. A definition of a node as dependent on another node can be used to automatically generate a UI listener that updates other variables and the UI elements that display those variables whenever there is a change to a variable upon which they depend.

For example, in a tax preparation app, a user might update a single initial entry for gross income, and thereby cause hundreds of variables to update throughout the system as various intermediate values after deductions and credits are applied to the initial value. If the programmer is tasked with writing one or more lines of code for every single UI element, listening for a change in an associated variable, the risk of a typographical error or conceptual error causing the UT to incorrectly represent the underlying reality in memory is greatly increased. In contrast, if every variable is defined as a relationship with other variables, and every UI element's appearance is defined by its relationship to a variable, the code to update appearances whenever any variable changes can be automatically generated and thereby is assured to be free of error.

Similarly, in a multithreaded system, changing a data value in memory by one thread can automatically generate a signal which is listened for by another thread. The second thread then updates any variables or UI elements that depend on the changed value, without the programmer having had to do anything but define the logical relationship between variables.

Scenarios

Scenarios may be expressed in a series of instructions that contains one or more statements for execution and at least begins with a requested simulated change that effectively says "Assuming or given that these one or more variables have these values, perform the following calculations:" and causes a "tweak" of the one or more variables to be stored in memory.

At the conclusion of the scenario, the simulated change ends, and any further code statements referencing a tweaked node will return the original, unchanged value, without the developer needing to reset or reverse the tweaking of the node.

In some embodiments, every node may be tweakable by a scenario, though in a preferred embodiment, the developer explicitly declares each node to be tweakable or non-tweakable, with the default state being non-tweakable unless specified otherwise.

In a preferred embodiment, tweaks may be expressed in the form "<Tweak Target> <Tweak Operator><Tweak Value>". For example, a tweak of "given(car.price:=25.0)" may set the car object's price member explicitly to 25 within the simulated change apparatus, so that all code within the given block that attempts to refer directly or indirectly to that member will instead be directed to the simulated change apparatus and return 25 without fail. A tweak of "given (car.price:+=25.0)" may instead cause storage within the simulated change apparatus of a value that has been increased by 25 from the immutable price, and all code within the given block will only be able to reference the increased value stored by the simulated change apparatus. However, in both cases, the original car object remains completely unchanged, both by the simulated change apparatus, which only caches the node and intercepts requests for the original node, and by the rest of the code, which is not permitted to change the immutable node and is only permitted to look up a cached value or potentially request that further caching occur via additional given statements or tweaks.

In some embodiments, a simulated change request may be permitted to tweak a reference to a class itself, affecting every object instantiated from that class in the same way, or to tweak a method or variable of a class itself, affecting the method or variable of every object instantiated from the class, rather than only acting on the node that is a single object or a member associated with a single object. For example, in software that generates representations of a number of cars in traffic and in which a developer wishes to simulate a change in the overall speed of the cars, a given statement may apply to the Car object itself as a tweak instead of requiring the developer to loop through every instantiated car and tweak its speed individually.

Nesting or Stacking of Scenarios

Further, scenarios may overlap, so that a second simulated change is described while a first simulated change is already in effect.

Overlapping scenarios may be accomplished in some embodiments by strict nesting of one statement within another, in the same way that "if" statements typically follow a condition with a bracketed section of instructions that is fully resolved before leaving the bracketed section.

Alternatively, some non-preferred implementations may allow scenarios that only partially overlap, having start and end points such that commands may be sequentially provided to request a first simulated change, request a second simulated change, request end of the first simulated change, and request end of the second simulated change, such that there are instructions for which both changes are in effect as well as those for which only one simulated change or the other is in effect, and neither is nested within the other.

In some circumstances, overlapping scenarios may have conflicting tweaks. For example, code might be written that states

```
given(a := 3) {
    object.doSomething( );
    given(b := a + 1, a := 4) {
        object.doSomethingMore( );
    }
}
```

In is case, the latter tweak, resetting the value of a, takes precedence over the earlier tweak, originally setting the value of a. As a result, all code statements in the nested scenario (such as the function doSomethingMore( )) occur under the assumption that a=4, not 3. However, because b's tweak refers to a and occurs within the first defined scenario, not the second—and therefore before the second tweak to a takes effect—the code statements in the nested scenario occur under the assumption that b=4, not 5. Performing the assignment of b immediately, before the node it depends upon, a, is changed, becomes an important consideration when deferred execution features described below are in use, and there is no guarantee that code statements will be executed in the same order they appear in the code.

Node Dependency

When a node is declared as tweakable, it may be thought of logically as a "dependent" node and the developer may be able to specify how a tweak to the "dependent" node should actually be treated as a tweak to a different, "independent" node.

For example, in an engineering application, a software object may represent a support beam inside a physical structure that has a certain width, and a certain resultant physical tolerance for stress. The object may also be configured to store a certain margin of error for safety that should be enforced on all such beams. If the developer wishes to simulate a certain stress on a building, she may create a given statement that explicitly sets the stress on the beam with a tweak, and then outputs a minimum necessary beam width to support the stress within the margin. Under these circumstances, it is highly likely that the developer will wish for the margin of error for safety to remain unchanged during all simulated change, and not to output a beam width that would tolerate the stress with a lower margin of error. The developer, when declaring the stress node to be tweakable at development, would add statements that clarify how to calculate a tweaked beam width at runtime based on a tweaked stress, into which the assumption that margin of error should never change can be enforced. Such code might appear as below:

```
@entity class Beam(@node(tweak = true) val width: Double, val marginOfSafety:
Double) {
    @node(tweak = true) def strength = getStrengthFromWidth(width) / marginOfSafety
    def strength_:=(newStrength: Double) = Tweaks.byValue(width :=
getWidthFromStrength(newStrength * marginOfSafety))
}
```

In another example, a software object representing a stock portfolio may contain a number of nodes for values of assets or other securities, as well as a total portfolio value. If the developer wishes to simulate performance of the portfolio under the assumption that it has a different overall starting value, she may need to specify rules for how the dependent value (total value) is used to derive the one or more independent values (the values of additional assets) that need to maintain logical consistency with the dependent value. The developer might, in this example, specify that a tweak to overall value of a given proportion should be applied in the same proportion to each of the assets, so that the final sum of value is consistent with the values of each of its parts. Alternatively, other rules might be defined that allow for greater control and complexity of the relationship, such as specifying that all increases should be applied to a certain asset type, or prioritizing an order in which decreases are applied to asset types sequentially until they are completely depleted. Such rules might be expressed as follows:

```
@entity class Portfolio(@node(tweak = true) val cash: Double, @node(tweak = true)
val stocks: Double, @node(tweak = true) val bonds: Double) {
   @node(tweak = true) def total Value = cash + stocks + bonds
   def totalValue_:=(newTotalValue: Double) =
      Tweaks.byValue(cash := cash * (cash + stocks + bonds / newTotalValue),
         stocks := stocks * (cash + stocks + bonds / newTotalValue),
         bonds := bonds * (cash + stocks + bonds / newTotalValue))
}
or
@entity class Portfolio(@node(tweak = true) val cash: Double, @node(tweak = true)
val stocks: Double, @node(tweak = true) val bonds: Double) {
   @node(tweak = true) def totalValue = cash + stocks + bonds
   def totalValue_:=(newTotalValue: Double) = {
      val change = newTotalValue – totalValue
      if (change > 0) {
         Tweaks.byValue(cash := cash + change)
      } else {
         Tweaks.byValue(cash := cash + change)
         if (cash < 0) {
            Tweaks.byValue(stocks := stocks + cash)
            Tweaks.byValue(cash := 0)
         }
         if (stocks < 0) {
            Tweaks.byValue(bonds := bonds + stocks)
            Tweaks.byValue(stocks := 0)
         }
      }
   }
},
``` respectively.

In another example, a software object representing an event may have a starting time, ending time, and resultant duration. The developer may desire the behavior that logical consistency be maintained between these values by treating a simulated change to duration as changing the ending time to the appropriate value and leaving the starting time always unchanged. The event node may then be represented as:

```
import java.time.Duration
import java.time.Instant
@entity class Meeting(val title: String, @node val start: Instant, @node(tweak = true)
val end: Instant) {
   @node(tweak = true) def duration = Duration.between(start, end)
   def duration_:=(newDuration: Duration) = Tweaks.byValue(end := start plus
newDuration)
   @node def description = s"$title: $start -> $end [ ${duration.toSeconds}s ]"
}
```

In the above example, the start value remains non-tweakable as a default setting, while end and duration are tweakable, and the method is specified for how a tweak to duration is converted at runtime into a logically-equivalent tweak to end that can be used in place of a tweak to duration to achieve the same effect.

Scenario Independence

Certain nodes are scenario independent, either because they are not tweakable and do not depend on a tweakable node, or because they are explicitly declared with a "@scenarioindependent" or similar modifier in the written code that ensures that they cannot be made dependent on a value that may change between scenarios.

Further, even when a node is not explicitly scenario independent, it can be effectively independent with respect to multiple scenarios, if those scenarios change variables that the node does not depend on. In every such scenario, the value of the node will be unchanged. Such scenario independence can be automatically determined in advance through code analysis or at runtime by observing the lack of change in the variable across scenarios.

Figure 4:
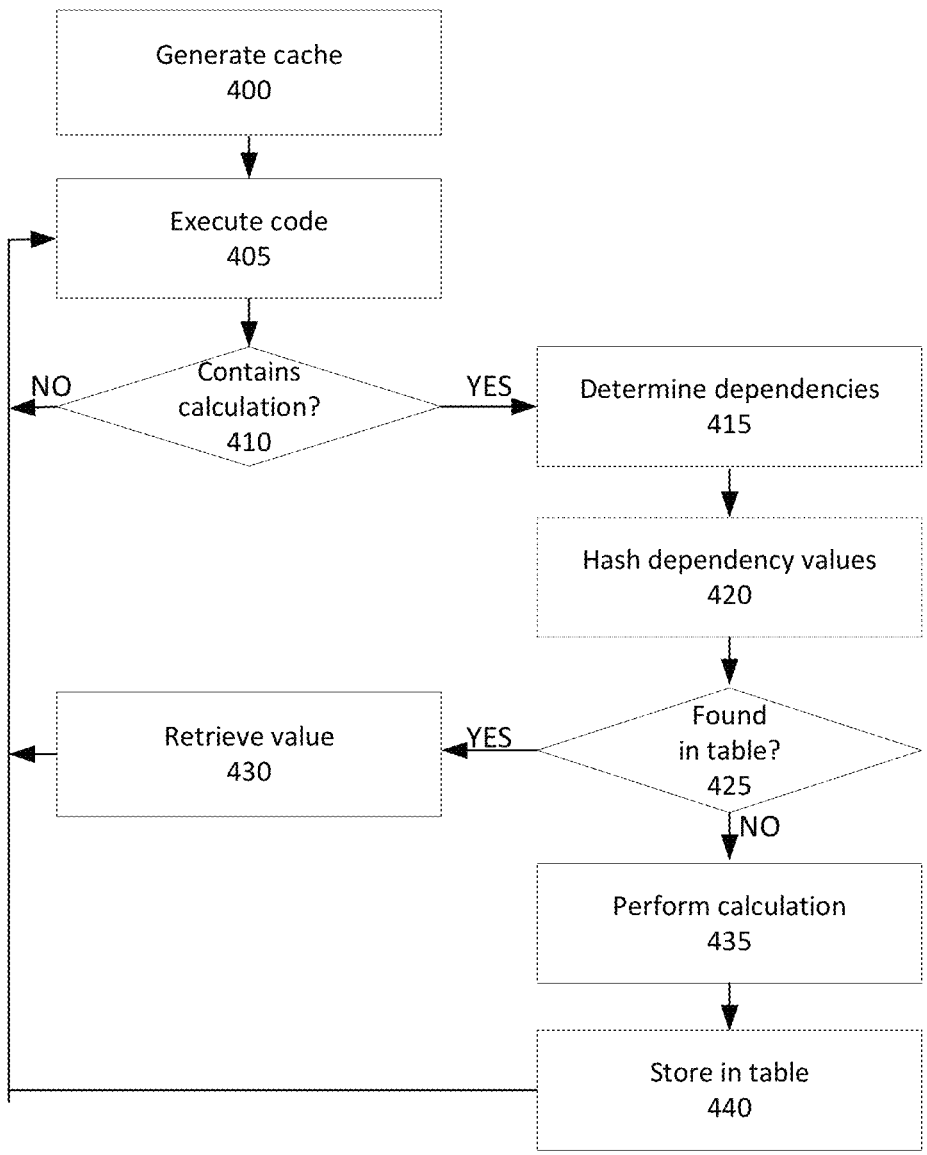
FIG. 4 depicts a method of storing and retrieving values from a cross-scenario cache.

When the logical relationships between nodes are strictly defined, it is possible to store the result of a particular function or calculation and establish a "scenario independent cache" of calculations that have been performed in the past but are still valid in all scenarios. FIG. 4 depicts a method of storing and retrieving values from a scenario-independent cache.

After establishing the scenario-independent cache when execution of code commences (Step 400), each line of code is evaluated for execution (Step 405).

If a particular statement of code would require a calculation to be performed (Step 410), the scenario-independent cache is consulted to see if an applicable version of the calculation has already been performed.

In order to determine applicability, first, the set of nodes upon which the calculation depends is determined (Step 415). For example, a calculation of the density of an ingot of metal depends on four factors: its height, its width, its length, and its mass. A "density" node or a function that determines density would already have associations in memory with the four nodes storing those four qualities of the ingot.

In some embodiments, all values upon which the calculation depends am appended together and the result is hashed (Step 420). Hashing can allow for an efficient key structure to use in table storage (or another data structure) when looking up a vast number of cached calculations; the lookup will "fail fast" if there is not a match rather than having to iterate over a large number of stored entries. In other embodiments, hashing may be non-preferred because the differing values defining the scenario may not be meaningfully different for many of the values that will be calculated during those scenarios. For example, two scenarios may each have ten tweaked variables, with nine of the tweaks being the same; the majority of calculated values in each scenario may be identical even though a hash of the scenario definitions would not encode that similarity or allow a cache to take advantage of that overlap.

Whether using a hashed value as the key, or searching for the unhashed values, the data structure is searched to determine whether it already contains a value for the given combination of values (Step 425).

If the already-calculated value is present in memory, it is retrieved from memory (Step 430). Otherwise, the calculation is performed (Step 435) and the outcome stored in the cache (Step 440). Either way, the calculation's result is used to update the current program stack and execution of code continues (back to Step 405).

As a result of the above method, a class that performs the same time-intensive calculation many times may have significant time savings by pulling a value from the cache instead of recalculating. This concept can be extended to storing calculations for use in other scenarios when simulated changes would have no impact on those calculations, for a cross-scenario cache.

For example, in a complex application that models dependencies between many variables, it is likely that not every tweakable node will affect the result of a time-intensive calculation. Under normal circumstances, the cached result of a calculation can only be reused if the set of tweaks in the present scenario exactly matches the set of tweaks associated with the cached value. This might mean that attempts to search the cache for a cached result fail because of the strict parameters of the cache search, and there are cache misses of results that could have been reused from cache.

However, in an alternative embodiment, a special, laxer mode of tweak set evaluation can be specified for expensive functions where the inefficiency and time cost of a cache miss is unacceptable. By recording all dependencies accessed when a function is evaluated, a set of relevant tweaks containing only a subset of all tweaks in effect can associated with the result when it is stored in the cache. Then, when a search of the cache is performed with a new set of tweaks, the cached result can be used when the set of tweaks associated with it is a strict subset of the tweaks currently in effect, rather than a perfect match.

The cache lookup itself becomes somewhat more expensive in this mode, because the lookup must compare sets of tweaks to determine whether it is safe to reuse the cached result, rather than immediately failing to match in the presence of different scenarios. Since the cache lookup itself is more expensive, the lookup may itself be cached to be performed faster. As a result, if there are two requests to the same function that has been evaluated in this alternative mode, the expensive cache lookup itself only has to happen once. The second call to the function waits for the result of the first cache lookup, and the second function call is fully evaluated only if the set of tweaks currently in effect are incompatible with the set of tweaks that were both in effect and influenced the outcome of the first function call was evaluated and cached. If no incompatibility exists, the cached value is reused and the function does not need to be re-evaluated, despite the change in the set of tweaks in effect.

In some embodiments, a result may not always change even despite completely different simulated change values. At a trivial level, a query for static, read-only data from a data store will always return the same result, so such a query may be reused no matter what set of simulated changes are in effect. However, results can sometimes be cached even when querying data stores simulate being non-static, such as a persistent data store representing what attributes an object had at each given moment in time until the object was next updated. One simulated change may involve making a query to determine an attribute of the object at a first timestamp, while another simulated change may involve making a query to determine the attribute of the object at a second, later timestamp, despite no change to the object having occurred between those two times. When a simulated change is a tweak to the query timestamp, under the usual mode of evaluation, the cached first query result cannot be reused to satisfy the second evaluation of the query, because the timestamp is stored in a cache key. If the simulated changes to the timestamp differ, so do the cache keys and there is no cache hit.

If instead of a unique variable value, the cache key is modified to store a range of values for the particular variable, a cache hit may be possible. This avoids a situation where an application calls the node with a range of simulated changes at regular intervals, evaluates the node multiple times, and makes a query to an unchanging underlying data store for each query, wasting resources when a single query could have been safely reused in each simulated change within a range.

Further, this can be optimized by emitting a compressed token representing the query to the client. An apparatus can then be constructed where the client can enquire of a particular token and a new simulated change whether that node is still valid with the new simulated change. If the apparatus responds that the node is still valid, then the cache knows that it may reuse the already held node value.

Another, analogous optimization can be performed when the underlying calculations during a scenario will involve rounding, truncation, or other discrete operations that depart from the usual set of continuous mathematical operators. If a function is going to round its input to the nearest integer, dollar, cent, or similar discrete value before using the input, then a small variation in the simulated change may be immaterial to the final result of the calculation. In those cases, a given node result may be associated with a range of simulated changes which will all resolve to the same outcome due to rounding during calculation. Then, in future calculations, previously cached results are reused when their simulated changes are sufficiently close to the current simulated change. For example, a payroll application may round hours worked to the nearest fifteen-minute increment. If the application has already calculated wages earned for 35 hours of work, it should associate a range from 34.88 to 35.12 with the cached result, and reuse the calculation during simulated changes that depart from 35 by only a small amount.

Division and Deferral of Computational Labor

Figure 5:
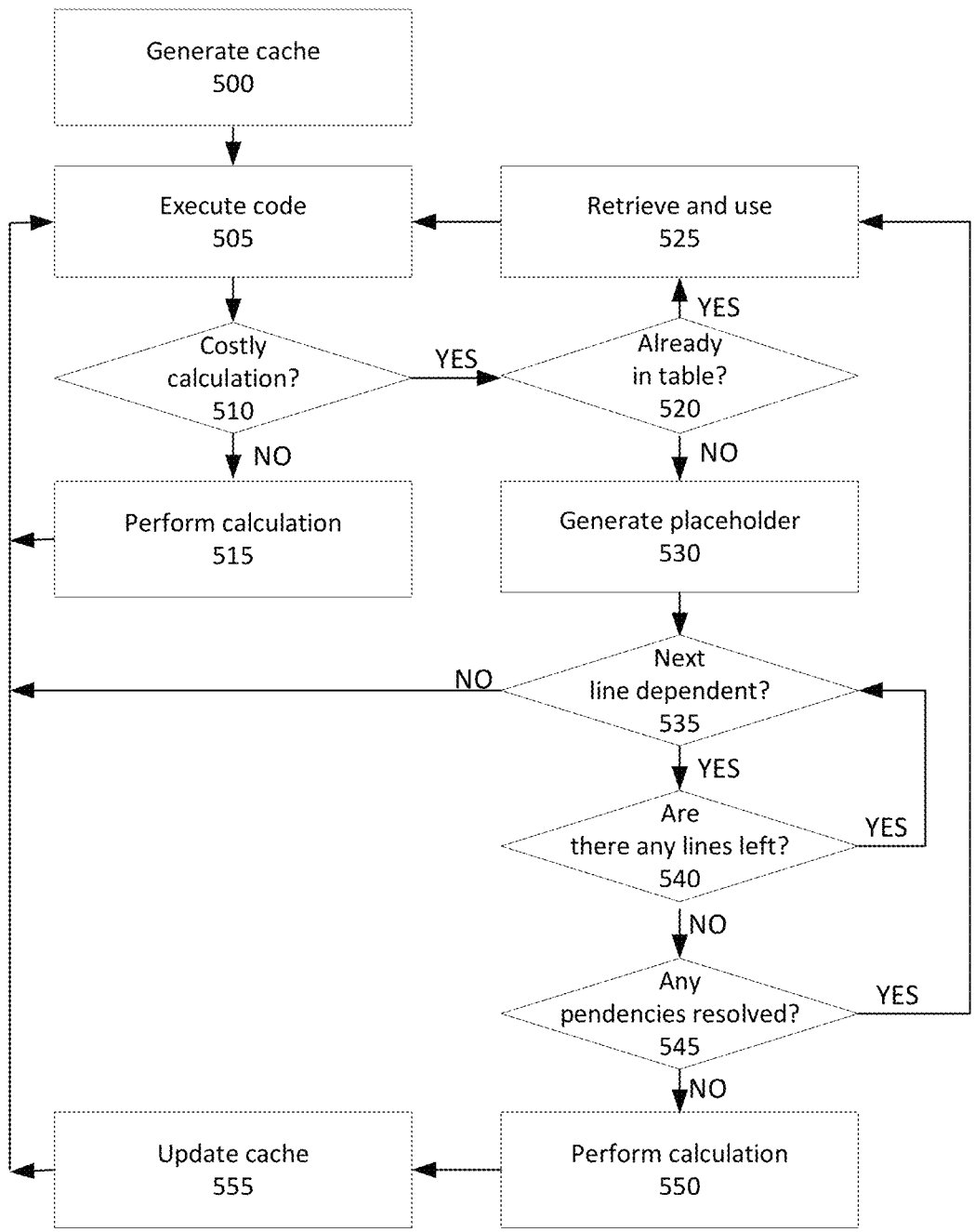
FIG. 5 depicts a method of deferring and sharing execution between one or more threads or devices.

Further, the use of a cross-scenario cache enables a model of efficient computation wherein two or more concurrent threads, or any other entity performing computations on a computing device, can share results of their computation, even when operating with differing data inputs or within different scenarios, and drastically reduce overall computation time. FIG. 5 depicts a method of deferring and sharing execution between one or more threads or devices.

As before, after establishing the cross-scenario cache when execution of code commences (Step 500), each line of code is evaluated for execution (Step 505).

Each calculation or function call may have been evaluated in advance to determine the total resources needed to perform it, in terms of computation time, latency in communicating with a database or other data store, or memory needed to store intermediate steps of the calculation. If the total resources do not exceed a particular threshold (Step 510), the calculation is simply performed (Step 515) and the execution of code continues (back to Step 505).

If the resources do exceed the threshold, the code may consult the cross-scenario cache previously described to see if the results of that calculation have already been stored from a previous iteration of the calculation in this or a different scenario (Step 520).

If the cross-scenario cache does contain the calculation, the system simply retrieves it for use (Step 525) and continues executing code (back to Step 505). If the cross-scenario cache does not contain the calculation, the system may generate a placeholder in the cache, indicating that the execution of the code ultimately relies on determining this value (Step 530). At this moment in time, it is possible that a new thread can be generated for each of one or more other calculations needed to determine the value. For example, in the example above where a totalSum node depends on an a, b, and c, the current thread may, upon learning that none of a, b, and c are cached, create two new threads to calculate b and c, flag each of a, b, and c as pending calculation, and begin calculating the value of a. This process may be recursive; if b or c depend on further calculations, each of the newly created threads may create more threads as necessary.

While the calculation is still left pending and unperformed, the next line of code can be evaluated to determine whether it actually relies on any calculation nodes that are still pending (Step 535). If not, it can be performed as usual (back to Step 505). If so, and if there are further lines of code to execute (Step 540), each of them can be evaluated in turn to see if any can be performed as usual while calculations are still pending (back to Step 505).

Eventually, the code will reach a point where it has multiple computations pending and no code that it can execute without calculating at least one of the pending computations. First, the cross-scenario cache can be consulted to determine whether any other thread previously created has completed the calculations assigned to that thread and cached that value (Step 545).

If so, computation can possibly resume (Steps 525 and following) until being in a completely pending state again.

If not, one or more pending calculations will finally be performed (Step 550) and the cross-scenario cache will be updated (Step 555). Then, computation can resume.

A particular advantage of waiting until many calculations are pending is that calculations can often be efficiently batched, such as combining multiple queries to a database to be performed at the same time, or sending multiple similar calculations to a graphics processing unit (GPU) or other system specializing in parallel processing.

As a result of all of the above conceptual advances, computations are performed only when absolutely needed to proceed, and code that is written in a particular order but that does not actually depend on being executed in that order can essentially be re-arranged at run time to perform all calculations in the most efficient order possible to take advantage of previous computations.

If two threads share a cross-scenario cache during execution, the advantages are further compounded; one thread may ultimately focus on repeatedly performing one calculation while the other thread focuses on another, and the total labor is evenly divided between them, so that both threads conclude at about the same moment (in approximately half the time due to shared calculations), an advancement over the situation where each thread performs the full set of computations alone. In contrast to prior art parallelization systems, the cross-scenario caching and storage of all calculations upon which a calculation or value lookup may rely (along with a flag that another thread is working on them) allows even more efficient determinations of when a thread should calculate on its own, when it should wait for another thread to complete a calculation, and/or when it should create more threads to cache values for when they will imminently be used.

Implementing Devices

Figure 6:
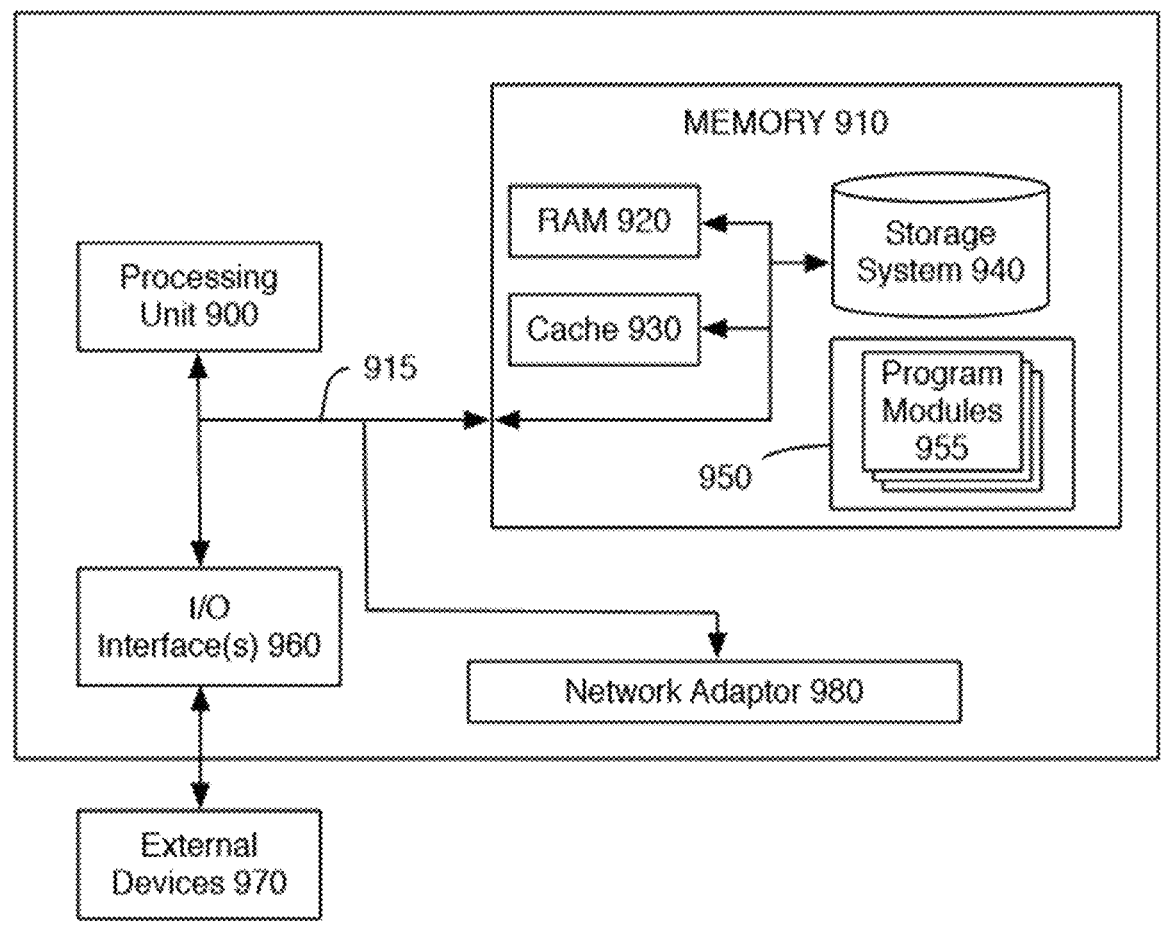
FIG. 6 is a high-level block diagram of a representative computing device that may be utilized to implement various features and processes described herein.

FIG. 6 is a high-level block diagram of a representative computing device that may be utilized to implement various features and processes described herein, including, for example, for executing any of source code editor 100, compiler 110, or VM 120. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 6, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application programs, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A system for executing software, comprising:
   a computing device comprising at least one processor and non-transitory memory storing first software instructions for a code execution module such that, when the first software instructions are executed by the at least one processor, the at least one processor will:
   establish a platform-independent architecture for managing a simulated change apparatus that maintains logical immutability of software nodes described in a programming language syntax;
   receive, for execution by the code execution module, second software instructions;
   create one or more immutable software nodes declared by the second software instructions;
   determine that the second software instructions comprise an instruction to begin a simulated change at runtime of the one or more immutable software nodes;
   store the simulated change in the simulated change apparatus;
   create a cache to store results of one or more operations of the second software instructions, wherein the cache is a cross-scenario cache used by distinct scenarios that each have a different set of simulated changes, but wherein at least one entry in the cache is shared by at least two of the distinct scenarios;
   using the simulated change apparatus, perform the one or more operations of the second software instructions as if the one or more immutable software nodes had been changed in the non-transitory memory, during a period of time where each of the one or more immutable software nodes is guaranteed to retain logical immutability; and
   output results of the one or more operations.

2. The system of claim 1, wherein, when a first set of simulated changes are modeled by the simulated change apparatus, a result is stored in the cross-scenario cache associated with a subset comprising all simulated changes of the first set that influenced the result, and wherein, when a different second set of simulated changes are modeled by the simulated change apparatus, the result is fetched from the cache and reused due to a determination that the entire subset of simulated changes is present in the second set of simulated changes.

3. The system of claim 1, wherein a computationally expensive node is marked for a special mode of evaluation and cache lookup, wherein dependencies of the node are collected during its first evaluation, and wherein a second evaluation under a different set of simulated changes still results in a cache hit so long as the different set of simulated changes does not overlap with the dependencies collected during the first evaluation.

4. The system of claim 3, wherein a first cache lookup of the computationally expensive node is itself cached, such that a subsequent request for a cache lookup of the result of the computationally expensive node does not perform the cache lookup, and instead waits for the result of the first cache lookup.

5. The system of claim 3, wherein a calculated value is cached not only with a simulated change value that was used to calculate the value, but also with a range of values for simulated changes that would result in the same calculated value, such that a future cache lookup of the calculated value will be returned if a simulated change has a value within the range.

6. The system of claim 5, wherein a token is used to symbolize a node and is used during a new simulated change to check whether the range contains the value, thereby determining that a cached value is still valid.

7. The system of claim 1, wherein when a single calculation depends on multiple scenario-independent calculations, one or more additional threads are generated, sharing the cross-scenario cache and storing results there for use by another thread.

8. The system of claim 7, wherein multiple calculations or queries are deferred and batched together before being assigned to another device or application capable of acting on the batched multiple calculations.

9. The system of claim 7, wherein, if a needed calculation by a first thread is already in progress in a second thread, the first thread refrains from performing the needed calculation and instead performs other calculations or waits until a later point at which the results of the needed calculation are already stored in the cross-scenario cache.

10. The system of claim 1, wherein one or more nodes that are tied together logically are associated with user interface elements, and wherein a simulated change in the one or more nodes automatically causes a corresponding visual change in the associated user interface elements.

11. The system of claim 1, wherein the second software instructions comprise both an instruction to begin a second simulated change while a first simulated change is in effect, and an instruction to end the second simulated change without ending effect of the first simulated change.

12. The system of claim 1, wherein the simulated change apparatus stores the simulated change as a node and a set of nodes upon which the node depends that are not scenario-independent, such that, when one node of the set of nodes is changed in a scenario, a recalculation of the node that depends on it is triggered.

13. A system for executing software, comprising:
a computing device comprising at least one processor and non-transitory memory storing first software instructions for a code execution module such that, when the first software instructions are executed by the at least one processor, the at least one processor will:
receive, for execution by the code execution module, second software instructions;
create one or more immutable software nodes described in the second software instructions;
determine that the second software instructions comprise an instruction to begin a simulated change at runtime of the one or more immutable software nodes;
store the simulated change in a simulated change apparatus;
create a cache to store results of one or more operations of the second software instructions;
using the simulated change apparatus, perform the one or more operations of the second software instructions as if the one or more immutable software nodes had been changed in the non-transitory memory, during a period of time where each of the one or more immutable software nodes is guaranteed to retain logical immutability; and
output results of the one or more operations;
wherein the cache is a cross-scenario cache used by distinct scenarios that each have a different set of simulated changes, and wherein the first software instructions are for a virtual machine that has been modified to create the simulated change apparatus and to monitor the second software instructions for an instruction to begin the simulated change.

14. The system of claim 13, wherein the virtual machine, in response to determining existence of a reference in the second software instructions to one of the one or more immutable software nodes, automatically redirects the reference to the simulated change apparatus to return a value therefrom.

15. The system of claim 13, wherein when a single calculation depends on multiple scenario-independent calculations, one or more additional threads are generated, sharing the cross-scenario cache and storing results there for use by another thread.

16. The system of claim 15, wherein multiple calculations or queries are deferred and batched together before being assigned to another device or application capable of acting on the batched multiple calculations.

17. The system of claim 15, wherein, if a needed calculation by a first thread is already in progress in a second thread, the first thread refrains from performing the needed calculation and instead performs other calculations or waits until a later point at which the results of the needed calculation are already stored in the cross-scenario cache.

18. The system of claim 13, wherein one or more nodes that are tied together logically are associated with user interface elements, and wherein a simulated change in the one or more nodes automatically causes a corresponding visual change in the associated user interface elements.

19. The system of claim 13, wherein the simulated change apparatus stores the simulated change as a node and a set of nodes upon which the node depends that are not scenario-independent, such that, when one node of the set of nodes is changed in a scenario, a recalculation of the node that depends on it is triggered.

20. A system for executing software, comprising:
a computing device comprising at least one processor and non-transitory memory storing first software instructions for a code execution module such that, when the first software instructions are executed by the at least one processor, the at least one processor will:
receive, for execution by the code execution module, second software instructions;
create one or more immutable software nodes described in the second software instructions;
determine that the second software instructions comprise an instruction to begin a simulated change at runtime of the one or more immutable software nodes;
store the simulated change in a simulated change apparatus;
create a cache to store results of one or more operations of the second software instructions;
using the simulated change apparatus, perform the one or more operations of the second software instructions as if the one or more immutable software nodes had been changed in the non-transitory memory, during a period of time where each of the one or more immutable software nodes is guaranteed to retain logical immutability; and
output results of the one or more operations;
wherein the cache is a cross-scenario cache used by distinct scenarios that each have a different set of simulated changes, and wherein the second software instructions are generated via a compiler that adds instructions for generating the simulated change apparatus to source code of the second software instructions and that encapsulates existing instructions of source code of the second software instructions to begin a simulated change with additional instructions to redirect references to the one or more immutable software nodes to the simulated change apparatus.

21. The system of claim 20, wherein when a single calculation depends on multiple scenario-independent calculations, one or more additional threads are generated, sharing the cross-scenario cache and storing results there for use by another thread.

22. The system of claim 21, wherein multiple calculations or queries are deferred and batched together before being assigned to another device or application capable of acting on the batched multiple calculations.

23. The system of claim 21, wherein, if a needed calculation by a first thread is already in progress in a second thread, the first thread refrains from performing the needed calculation and instead performs other calculations or waits until a later point at which the results of the needed calculation are already stored in the cross-scenario cache.

24. The system of claim 20, wherein one or more nodes that are tied together logically are associated with user interface elements, and wherein a simulated change in the one or more nodes automatically causes a corresponding visual change in the associated user interface elements.

25. The system of claim 20, wherein the simulated change apparatus stores the simulated change as a node and a set of nodes upon which the node depends that are not scenarioindependent, such that, when one node of the set of nodes is changed in a scenario, a recalculation of the node that depends on it is triggered.

* * * * *